US006578466B2

(12) United States Patent
Rebeaud

(10) Patent No.: US 6,578,466 B2
(45) Date of Patent: Jun. 17, 2003

(54) SHEET-PROCESSING MACHINE

(75) Inventor: Jean-Claude Rebeaud, Le Mont-sur-Lausanne (CH)

(73) Assignee: Bobst S.A. (CH)

( * ) Notice: Subject to any disclaimer, the term of this patent is extended or adjusted under 35 U.S.C. 154(b) by 137 days.

(21) Appl. No.: 09/848,945

(22) Filed: May 4, 2001

(65) Prior Publication Data

US 2001/0038176 A1 Nov. 8, 2001

(30) Foreign Application Priority Data

May 5, 2000 (CH) ............................................. 0884/00

(51) Int. Cl.[7] .................................................. F16J 3/00
(52) U.S. Cl. .................................. 92/103 R; 184/11.1
(58) Field of Search ....................... 92/103 R; 100/341; 184/6.27, 109, 11.1

(56) References Cited

U.S. PATENT DOCUMENTS 4,180,390 A * 12/1979 Furstenberg ................ 55/272

* cited by examiner

*Primary Examiner*—Edward K. Look
*Assistant Examiner*—Michael Leslie
(74) *Attorney, Agent, or Firm*—Ostrolenk, Faber, Gerb & Soffen, LLP

(57) ABSTRACT

A sheet-processing machine operating in cycles, inter alia a shaping press, during which a cyclic excess air pressure is produced in a covered part of the machine, where the covered part has an opening (6) on the perimeter of which a diaphragm is fixed, the diaphragm being made of an elastic material which is substantially impermeable and resistant to the oil lubricating the machine (9).

Figure 2:
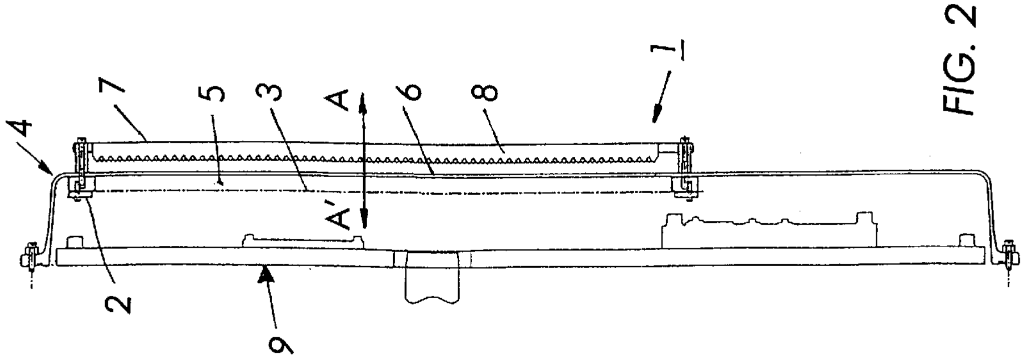

The diaphragm can be a fabric (3) substantially permeable to air and stretched on a frame (2) surrounding the opening (6).

8 Claims, 1 Drawing Sheet

SHEET-PROCESSING MACHINE

The invention relates to a machine for processing sheets and operating in cycles during which a moving part of the machine produces a cyclic excess pressure of air in a covered part of the machine.

In many machines of the kind defined hereinbefore, a sequence of excess pressures and negative pressures, ranging from a few millibars to few tens of millibars, results from the movement of a part or set of moving parts which in cyclic manner partially or totally move into and out of a part of the machine protected by a body.

The general function of a body is to protect, but not to form a completely sealing-tight envelope. Machine bodies usually have a number of openings or slots for control rods or levers, cables, drive shafts and the like.

The moving parts generally have to be lubricated with grease or oil in order to operate. During normal operation of these parts, a small but not negligible quantity of grease or oil in contact with the moving parts is sprayed into the surrounding atmosphere in the form of drops or droplets or evaporates. Some constituents of the lubricating products may evaporate selectively.

Owing to the movement of air and the excess pressure produced by the moving parts, air enters and exits from the covered part. The outgoing air entrains drops or droplets or evaporated constituents of the lubricating product. These drops or vapours produce a smell which may inconvenience the machine operators in the workshop containing the machine. It is therefore desirable to find means to prevent such products from spreading in the workshop atmosphere.

In the special case of automatic shaping presses for paper or cardboard packaging, droplets or oil vapour may also be adsorbed on to the sheets of paper or cardboard being shaped. There is therefore a risk that the cut blanks for forming folding boxes may after shaping contain traces of machine oil or grease or may even have undesirable smells, and will therefore be judged unsuitable for use, especially in the food or pharmaceutical sector.

The aim of the invention is to propose means for reducing or eliminating evaporation of oil due to operation of the said machines.

This object, in the case of a machine of the kind defined in the preamble, is obtained by forming an opening in the body of the covered part where the cyclic pressure variation occurs, a diaphragm being fixed around the perimeter of the opening and made of a material which is elastic, substantially impermeable and resistant to the products lubricating the said part of the machine.

As a result of the instantaneous internal excess pressure, the diaphragm inflates and increases the volume of the covered part by an additional volume which is instantaneously occupied by at least a part of the air which, in the absence of the device, would escape into the atmosphere.

According to the invention the diaphragm material is elastic. Owing to its elasticity, the diaphragm returns to its initial position during each cycle.

A sheet of flexible but non-elastic material will not be suitable. Tests by the applicants have shown that a diaphragm made of a sheet of flexible but substantially non-elastic plastic tends to rattle undesirably during each machine cycle. A skilled man might think a priori that if a sheet of plastic in the form of a pocket were disposed and fixed to the periphery of an opening in the body, the pocket would inflate and deflate during each operating cycle of the machine. Tests however have shown that in reality, such a chamber of flexible but non-elastic material inflates gradually during a transitory phase after starting the machine and finally remains almost completely inflated; the air inflow/outflow balance at each cycle of the assembly comprising the body fitted with a pocket or chamber of flexible but non-elastic material remains positive until the chamber has completely inflated. When the steady inflated state is reached, the system becomes totally ineffective.

On the contrary, in the case of an elastic diaphragm, the inflow/outflow air balance stabilises very quickly after a few machine cycles owing to the elasticity of the diaphragm, which tends to bring it back to its inoperative position.

Preferably the diaphragm material is substantially permeable to air.

During the phase of excess pressure inside the body and inflation of the diaphragm, air leaks through the other openings in the body are reduced by the diaphragm but are not zero. A diaphragm impermeable to oil but permeable to air acts as a filter which lets through some air at each excess-pressure phase and thus reduces the maximum value of the excess pressure. This decrease further reduces leaks through the other openings.

The diaphragm can be in the form of a bladder or pocket, the edges of which are secured to the edges of a corresponding opening in the body, e.g. by means of a flange. A pocket of this kind can be concertina-shaped.

In a preferred embodiment of the invention, the body comprises a frame forming the edges of the opening to which the diaphragm is fixed and by which the diaphragm is covered. Preferably in that case the diaphragm is slightly stretched on the frame, even when the machine is inoperative, to avoid rattling during cyclic operation. The diaphragm is stretched alternately towards the interior and towards the exterior of the frame when the machine is in operation.

To prevent the movement, i.e. vibration, of the diaphragm being behind the phase or even in phase opposition with the operating cycle of the machine, the dimension of the frame and the diaphragm material can be chosen so that the relaxation time of the fabric-covered frame is less than the cycle period of the machine.

Figure 1:
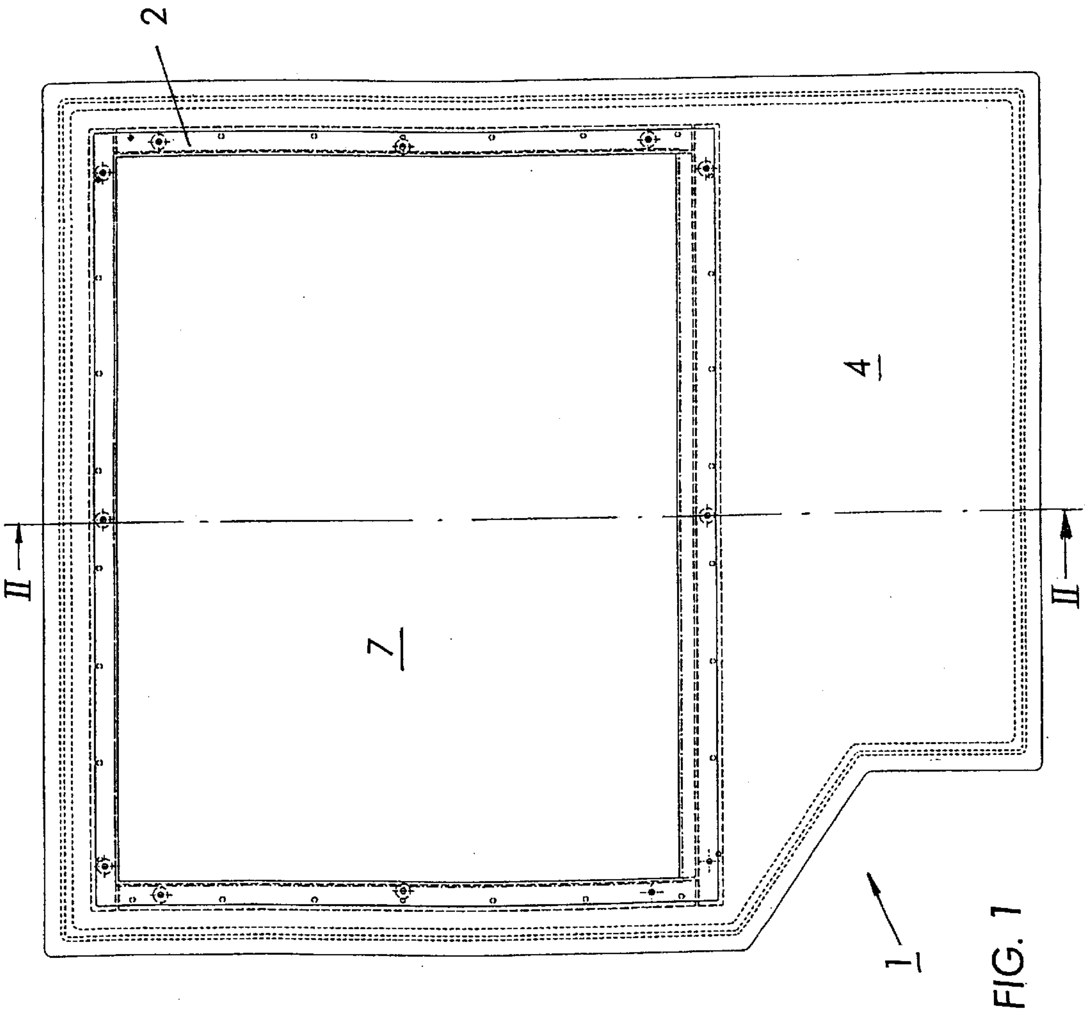

Other details and advantages of the invention will be clear to the skilled man from the description of a particular embodiment of the invention in conjunction with the drawings, in which FIG. 1 is a view in section and in perspective of a body part according to the invention.

FIG. 1 shows the hood of the body 1, which covers and protects the general drive system of an automatic shaping press for paper or cardboard packaging. In this kind of machine, the drive device is generally situated on the side opposite the operator, near the blanking platen. The movable beam of the blanking platen is generally separated from the drive device by an internal wall, but the wall is formed with a number of openings for shafts and drive chains.

The volume of air below the movable beam of the blanking station is in fluid communication with the volume of air surrounding the moving parts of the general drive. The parts driving the moving beam and the parts of the general drive are all liberally greased and are the main source of evaporated grease and/or oil from a said shaping press. The part of the machine where the main parts of the general drive device are situated also of necessity has openings to other parts of the machine, e.g. to the surrounding atmosphere. During each rising and descending cycle, the movement of the moving beam of the blanking station displaces a volume of air of the order of 50 to 70 liters. If all the openings in the machine body at this level are blocked or sealed to the maximum extent, experiments show a pressure increase of the order of 40–50 millibars in the zone of the machine situated under the blanking platen and around the general drive parts.

FIG. 2 is a diagrammatic view in section along II—II in FIG. 1.

As FIG. 2 shows, the hood of the body 1 of the general drive of machine 9 comprises a frame 2 mounted inside a raised part 4 and surrounding an opening 5. The dimensions of the opening are about 1 meter across and about 1.80 meters in height. A fabric 3 is fixed and slightly stretched on the frame. The fabric is elastic in both the weft and the warp direction and is impermeable and resistant to spraying oil. Of course, the fabric 3 can be substantially permeable to air but within limits which do not affect its desired function.

By way of example, use can be made of Isofilm Liner, a product made by Angst Pfister (Switzerland). This product comprises 81% PA and 19% PUE; it has wind-cheating properties but is substantially permeable to air. It is water-repellent and oil-repellent. Its elasticity is about 80% lengthwise and about 60% across, at a thickness of the order of 0.65 millimeters and a weight of approximately 240 $g/m^2$.

Opposite and at a distance from the elastic fabric 3, the hood has a second opening 6 with a protective device in the form e.g. of a grid 7 or any other protective device permeable to air displaced by the movement of the diaphragm.

A sound-absorbing wall 8 can be associated with the grid 7 in order to reduce the noise of the diaphragm in motion during operation.

When the hood of the machine 9 is fitted with the said fabric diaphragm, it is found during operation of the machine that the motion of the diaphragm in the direction of arrows A A' when inflated and deflated is in synchronism with the operation of the machine. The excess pressure measured inside the covered part equipped with the diaphragm is of the order of 10 to 15 millibars, i.e. approximately one quarter to one third of the excess pressure observed when the hood is completely closed. A simple olfactory test shows a marked reduction in the smell of oil in a workshop where the machine is in continuous operation under normal conditions.

What is claimed is:

1. A machine for processing sheets and operating in cycles during which a moving part of the machine produces a cyclic excess pressure of air in a covered part of the machine, wherein the body of the covered part has an opening on the perimeter of which a diaphragm is fixed, the diaphragm being made of an elastic material which is substantially impermeable and resistant to products for lubricating the said part of the machine.

2. A machine according to claim 1, wherein the said diaphragm material is elastic and substantially permeable to air.

3. A machine according to claim 1, wherein the diaphragm forms a chamber in the shape of a pocket, bladder or concertina.

4. A machine according to claim 1, wherein the said body of the covered part comprises a frame surrounding the opening and covered with the said diaphragm.

5. A machine according to claim 4, characterised in that the diaphragm is stretched on the frame (2).

6. A machine according to claim 4, wherein the dimensions of the frame and the diaphragm material are chosen so that the relaxation time of the covered frame is less than the cycle period.

7. A machine according to claim 1, wherein the diaphragm material is an elastic fiber substantially permeable to air and impermeable to liquids.

8. A machine according to claim 1, wherein the opening is formed in the part of the body nearest the general drive device of the press.

* * * * *